(12) United States Patent
Matteson

(10) Patent No.: US 6,404,836 B1
(45) Date of Patent: *Jun. 11, 2002

(54) REMOVABLE SPENT FUEL HANDLING MACHINE RAIL

(75) Inventor: Donn Moore Matteson, South Windsor, CT (US)

(73) Assignee: Westinghouse Electric Company LLC, Pittsburgh, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/248,987

(22) Filed: Feb. 12, 1999

(51) Int. Cl.$^7$ .......................... G21C 19/00; G21C 19/02
(52) U.S. Cl. ........................ 376/268; 376/269; 376/270; 376/271; 376/272
(58) Field of Search ................................ 376/268–272

(56) References Cited

U.S. PATENT DOCUMENTS

| | | | | |
|---|---|---|---|---|
| 3,637,096 A | * | 1/1972 | Crate | 214/18 |
| 3,677,328 A | * | 7/1972 | Buzzi et al. | 165/47 |
| 3,710,727 A | * | 1/1973 | Svensson | 104/120 |
| 3,793,739 A | * | 2/1974 | Hoffman et al. | 33/286 |
| 3,908,792 A | * | 9/1975 | Shortt | 182/37 |
| 4,053,067 A | * | 10/1977 | Katz et al. | 214/18 |
| 4,113,558 A | * | 9/1978 | Wade | 176/30 |
| 4,353,597 A | * | 10/1982 | Shoup | 298/12 |
| 4,487,741 A | * | 12/1984 | Vuckovich et al. | 376/271 |
| 4,511,531 A | * | 4/1985 | Swidwa et al. | 376/262 |
| 4,545,527 A | * | 10/1985 | Young | 238/8 |
| 4,639,993 A | * | 2/1987 | Kapoor | 29/400 |
| 4,649,016 A | * | 3/1987 | Hardin, Jr. | 376/261 |
| 4,832,902 A | * | 5/1989 | Kaufmann et al. | 376/268 |
| 4,894,900 A | * | 1/1990 | Rausfeisen et al. | 29/256 |
| 5,085,824 A | * | 2/1992 | Busch et al. | 376/268 |
| 5,319,686 A | * | 6/1994 | Pizzano et al. | 376/272 |
| 5,539,789 A | * | 7/1996 | Wachter | 376/252 |
| 5,553,686 A | * | 9/1996 | Jensen | 187/408 |

FOREIGN PATENT DOCUMENTS

| | | | |
|---|---|---|---|
| FR | 2682699 | * | 4/1993 |
| SU | 1188047 | * | 10/1985 |

OTHER PUBLICATIONS

Joint designs, Database [online], 1–2, Available web site: http:/www.ultrasonic-eng.co.uk/ultrasonic-joint-design.htm, Last update: unknown, Accessed on: Aug. 1, 2000.*

Joint designs used in Ultrasonic welding, Database [online], 1–3, Available web site: http:/www.tomantool.com/joint.htm, Last update: unknown, Accessed on: Aug. 1, 2000.*

* cited by examiner

Primary Examiner—Peter M. Poon
Assistant Examiner—Jack Keith

(57) ABSTRACT

A removable rail assembly for use with a spent fuel handling machine, including a support rail, a rail guide carried by the support rail, a rail joint connector supported by the rail guide for coupling the rail guide to adjacent rails, and at least one jacking screw supported by the support rail for lifting the support rail assembly. Another embodiment of the invention includes a second jacking screw received in the top surface of the rail guide. The joint connector is tongue and groove joint with a tapered parting line that permits a tight fit between the removable rail and adjacent fixed rails. During removal of the removable rail, the jacking screw distributes a uniform lifting force along the length of the rail, loosening the joint connector. Once the joint connector is loosened, the rail is coupled to a lifting crane and transported to a storage area.

12 Claims, 7 Drawing Sheets

REMOVABLE SPENT FUEL HANDLING MACHINE RAIL

FIELD OF THE INVENTION

This invention relates generally to a rail section for use in a nuclear power plant. More particularly, this invention relates to a spent fuel handling machine removable rail section.

BACKGROUND OF THE INVENTION

Generally, during refueling of a pressurized water nuclear reactor, fuel assemblies are transferred from the reactor vessel in the containment building to the fuel storage racks by means of a refueling machine, fuel transfer system and a spent fuel handling machine. The transfer of fuel assemblies takes place underwater. Portions of the fuel transfer system are located underwater in a canal adjacent to the fuel storage racks. The refueling machine and spent fuel handling machine move transversely over the fuel transfer system, reactor vessel and fuel storage racks on guide rails mechanically attached to the building floors. In certain arrangements of this equipment, the axis of the fuel transfer system is perpendicular to the spent fuel machine rails and is located directly under the rails. In order to remove portions of the fuel transfer system for maintenance, the rails must be removed to gain access to the equipment.

The precision alignment of the rails is critical to the operation of the refueling machine and spent fuel handling machine. Therefore, removable rail sections are required for the proper operation of the equipment. When the removable rail is in place, a tight fit with adjacent fixed rails is needed to permit unimpeded traversal of the rail. Gaps between abutting crane rail sections interfere with the proper operation of equipment traveling along the guide rails. Consequently, there is needed a removable rail system that forms and maintains a tight fit with adjacent fixed rails.

SUMMARY OF THE INVENTION

It is an object of the invention to provide a removable rail assembly providing a means for loosening the joint connector between the removable rail assembly and adjacent fixed rails.

It is another object of invention to provide a rail assembly having a tight fit between the removable rail assembly and adjacent fixed rails.

Directed to achieving the foregoing and additional objectives and overcoming shortcomings of the prior art systems, the present invention provides a removable rail assembly for use with a spent fuel handling machine, including a support rail, a rail guide carried by the support rail, a rail joint connector supported by the rail guide for coupling the rail guide to adjacent rails, and at least one jacking screw supported by the support rail for lifting the support rail assembly. An alternative embodiment of the invention shows a second jacking screw received in the top surface of the rail guide.

The jacking screws may be tightened independently or in combination to provide a force on the rail assembly for loosening the joint between the rail assembly and adjacent fixed rails. Once either one or both of the jacking screws have been tightened, causing the loosening of the joint between the removable rail and the adjacent fixed rail, the support rail is coupled to a lifting crane. The removable rail assembly is then removed and transported to a storage area. Once the refueling operation is completed, the removable rail is reinserted.

BRIEF DESCRIPTION OF THE DRAWINGS

The features and inventive aspects of the present invention will become more apparent upon reading the following detailed description, claims and drawings, of which the following is a brief description:

DESCRIPTION OF THE PREFERRED EMBODIMENTS

Figure 1:
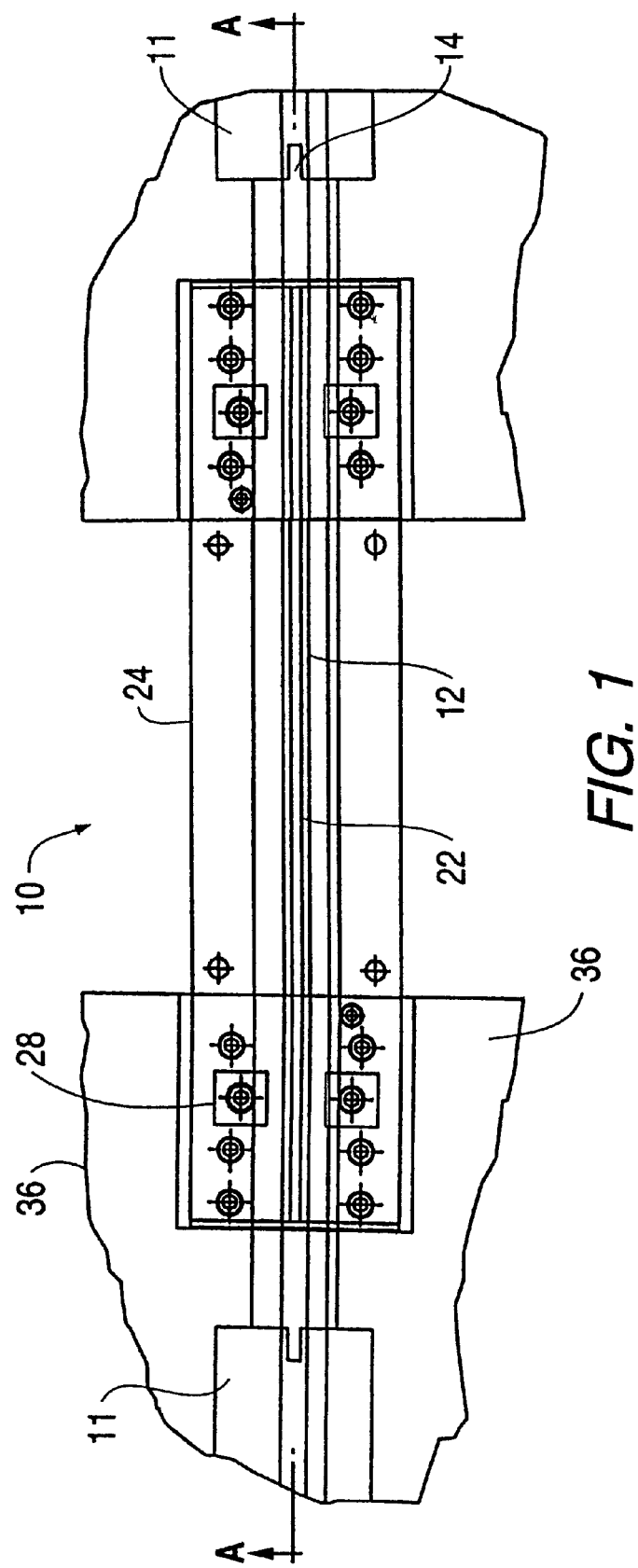
FIG. 1 is a top view of a removable rail assembly formed according to the teachings of the invention.

FIG. 1 shows an embodiment of a removable rail assembly 10 formed in accordance with the teachings of this invention. The rail assembly 10 includes a rail guide 12, a joint connector 14, and a support rail 24.

The rail guide 12 is a T-shaped member having a horizontally extending base 16 and an upwardly extending center portion 18. The center portion 18 supports a guide 20. The guide 20 extends horizontally outward from the center portion 18 at a location below the top 22 of the center portion 18. The location of the guide 20 below the top 22 of the center portion 18 should be sufficient to support the wheels or other portions of the spent fuel handling machine traveling along the rail guide 12.

Figure 2:
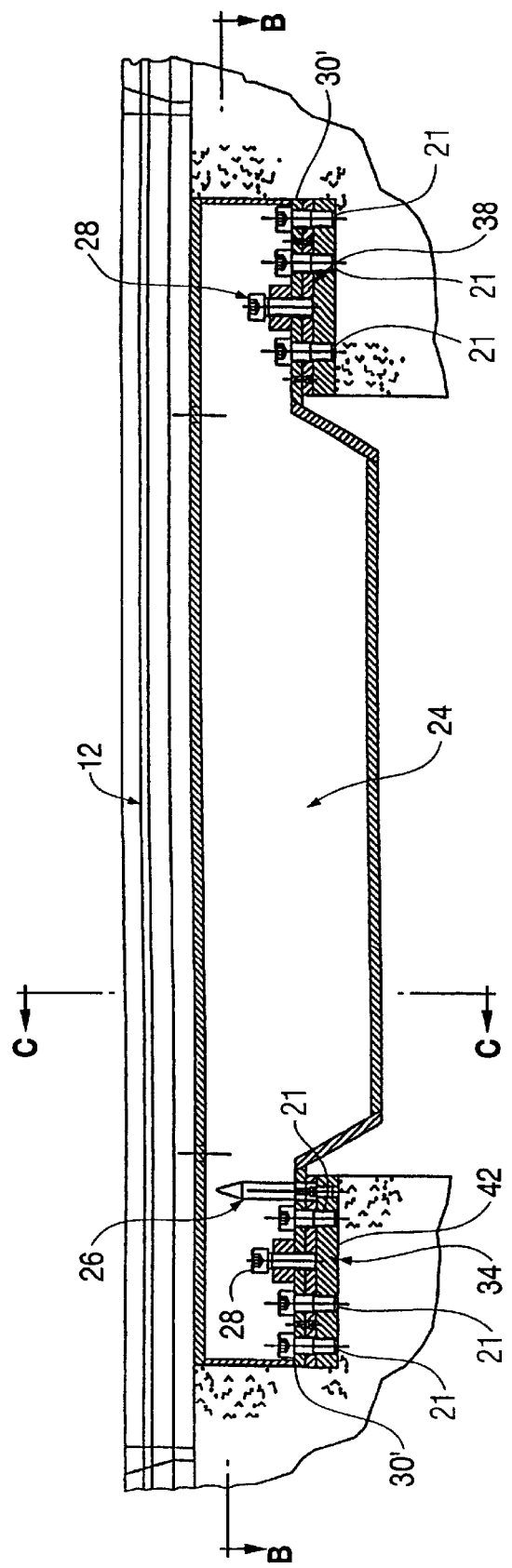
FIG. 2 is a sectional view taken along line A—A of FIG. 1.
Figure 3:
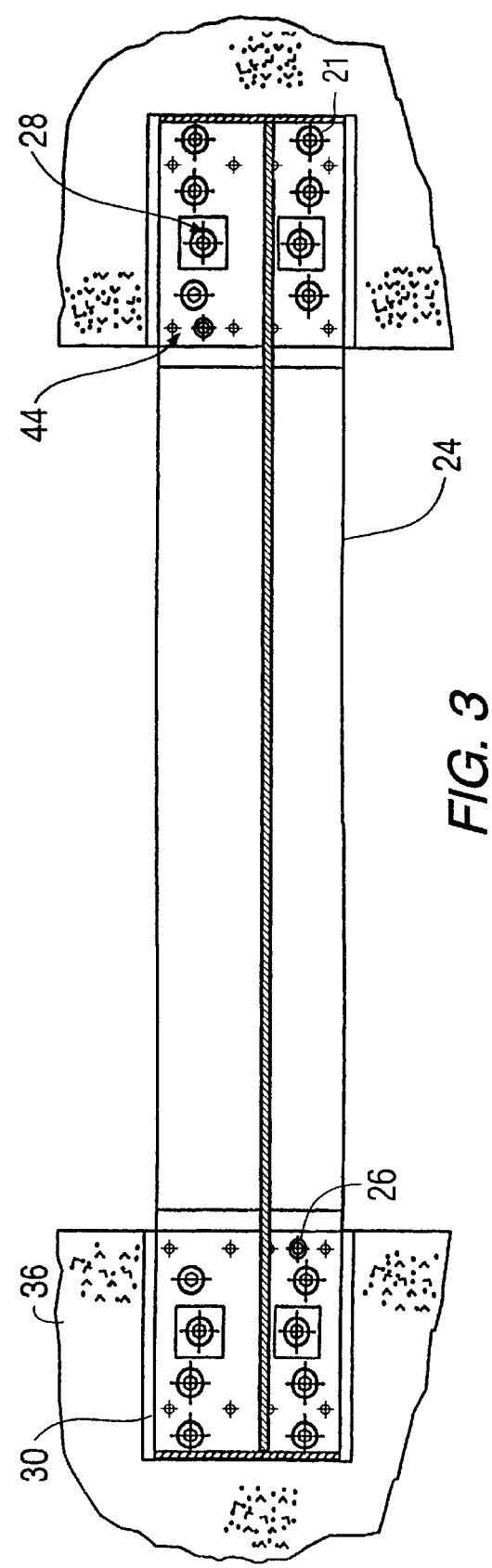
FIG. 3 is a top view showing a sectional view taken along the line B—B of FIG. 2.
Figure 4:
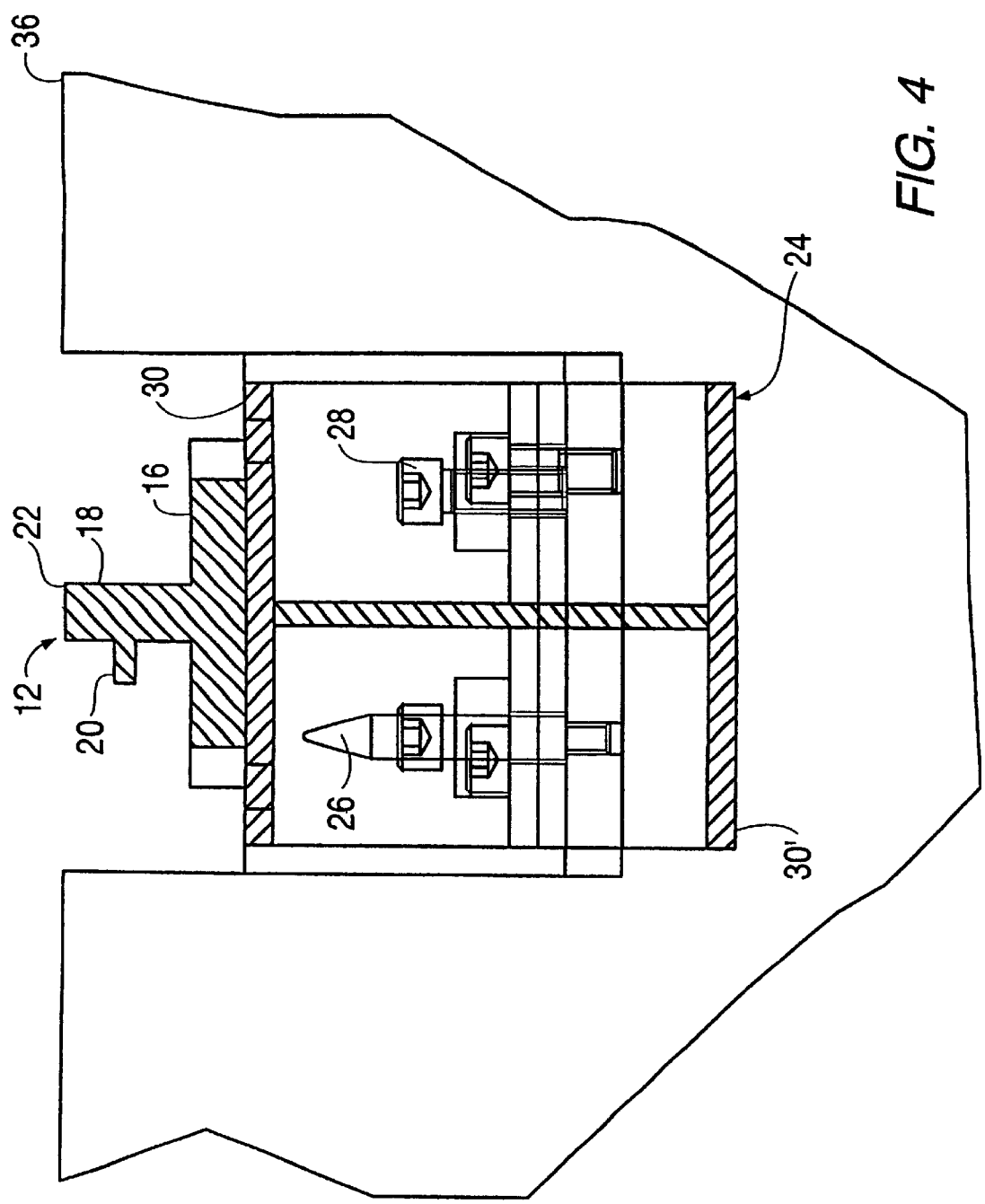
FIG. 4 is an elevational view taken along the line C'C of FIG. 2.

The rail guide is coupled to a support rail 24 as illustrated in FIGS. 2 and 4 using widely known techniques. As shown in FIG. 1, the rail guide 12 extends beyond the ends of the support rail 24 and onto a rail trench (not shown). The ends of the rail assembly 10 are each coupled to threaded rods (not shown) embedded in the floor 36. This arrangement not only provides an anchor point for the rail ends but also increases the stability of the joint between the rail assembly 10 and the fixed rails 11 due to the downward force on the rail guide 12.

The joint between the rail assembly 10 and the fixed rails 11 is established by a joint connector 14. As shown in FIG. 1, the joint connector 14 is formed as a tongue and groove joint having a tapered parting line, with the tongue located on the rail assembly 10. In a preferred embodiment, the tongue is approximately one-half the depth of the rail guide 12. This design establishes a tight fit between the removable rail assembly 10 and adjacent fixed rails 11, while simultaneously decreasing the force necessary to separate the rail assembly 10 from adjacent fixed rails 11 during removal due to the tapered parting line. It will be appreciated, however, that other methods may be used to join the rail assembly 10 to adjacent fixed rails 11.

Figure 7:
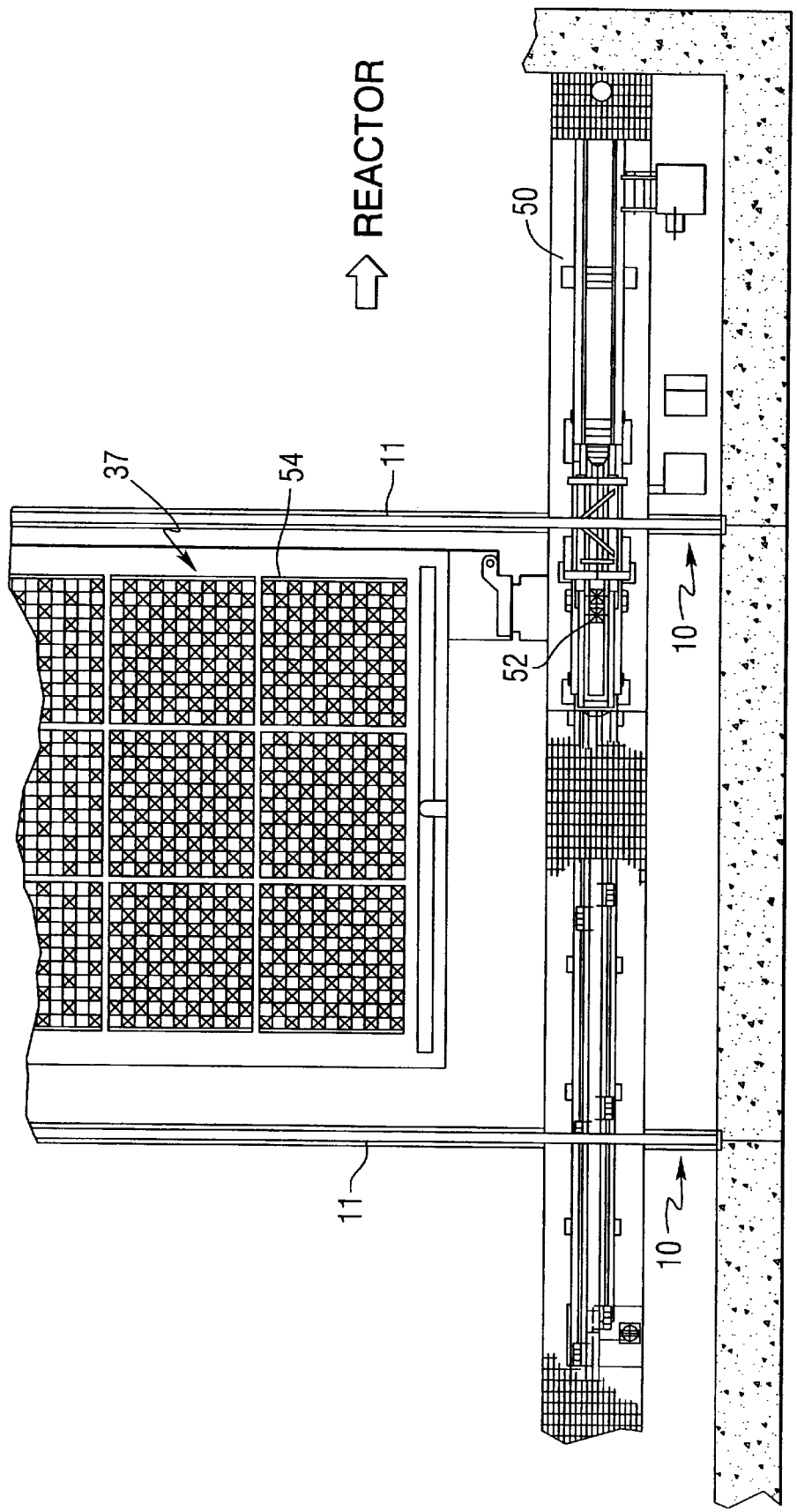
FIG. 7 is a plan view of the fuel handling system in the spent fuel handling building showing the location of the removable rail assembly according to the teachings of the invention.

As illustrated in FIGS. 2, 4 and 7, the support rail 24 includes an I-beam cross-section. However, it will be appreciated that in order to simplify installation, the support rail 24 preferably has a cross-sectional area identical to that used to support the fixed rails 11. The support rail 24 possesses a bending strength that limits the deflection of the spent fuel handling machine mast, and thus the radial loading of the mast bearings.

The support rail 24 is mounted in the operating floor 36, and is located above the spent fuel storage pool. The support rail 24 includes a depth having a length and terminates above the water level of the spent fuel storage pool 37. However, it will be appreciated, that it may not be possible to prevent the rail support 24 from extending into the water of the spent fuel storage pool 37.

The support rail 24 is mounted within the operating floor 36 such that the lower flange portion 30' is supported by an embedded plate 34. The embedded plate 34 is anchored to a recessed surface 42 defined by the floor 36, thus, providing foundational support for the rail assembly 10. The embedded plate 34 is coupled to the lower flange portion 30' of the support rail 24 by attachment bolts 21.

Additionally, the embedded plate 34 supports an alignment pin 26. The alignment pin 26 extends upwards from the embedded plate 34, and is received in an opening defined by the support rail 24 flange portions 30, 30'. The alignment pin 26 provides a guide that aids the removal and installation of the rail assembly 10.

Further, the embedded plate 34 defines an opening for receiving a jacking screw 28 for loosening the joint connector 14 by slightly raising the removable rail assembly 10. At least one jacking screw 28 is located at each end of the support rail 24. In the preferred embodiment, the support rail 24 supports a pair of jacking screws 28, as illustrated in FIGS. 1–4. Each jacking screw 28 is coupled to the support rail 24 by inserting each jacking screw 28 through mating holes in the support rail 24 flange portions 30, 30', wherein the openings in the flange portions 30, 30' align with mating holes in the embedded plate 34. Each jacking screw 28 provides a force along the length of the rail assembly 10 that causes a loosening of the joint connector 14 when the jacking screw 28 is tightened. In the preferred embodiment, each jacking screw 28 induces a uniform lifting force along the length of the rail assembly 10.

Once the joint connector 14 has been loosened, the support rail 24 is coupled to a lifting crane (not shown) and transferred to a storage area. The lifting crane is coupled to the support rail 24 flange 30 using commonly known techniques.

When installed in the floor 36, the top flange 30 of each removable rail assembly 10 is flush with the bottom of the floor 36 rail sections (not shown). A shim plate 38, positioned between the recessed surface 42 and the embedded plate 34, may be needed to raise the rail assembly 10 to the desired height. A bolt 44 couples the shim plate 38 to the support rail 24. The height of the shim plate 38 may be adjusted as needed to obtain the preferred height for the rail assembly 10.

FIG. 7 depicts a plan view of the fuel handling system in the spent fuel handling building showing the location of the removable rail assembly 10. When spent fuel is removed from the reactor, it is placed horizontally onto a carriage in the refueling canal 50. When the fuel reaches the spent fuel handling building, a fuel transfer system upender 52 moves the spent fuel from the horizontal to a vertical position. The spent fuel can then be picked up and placed into one of the spent fuel racks 54. The removable rail assembly 10 is useful, for example, when the upender 52 requires repair or other access to a compact space.

Figure 5:
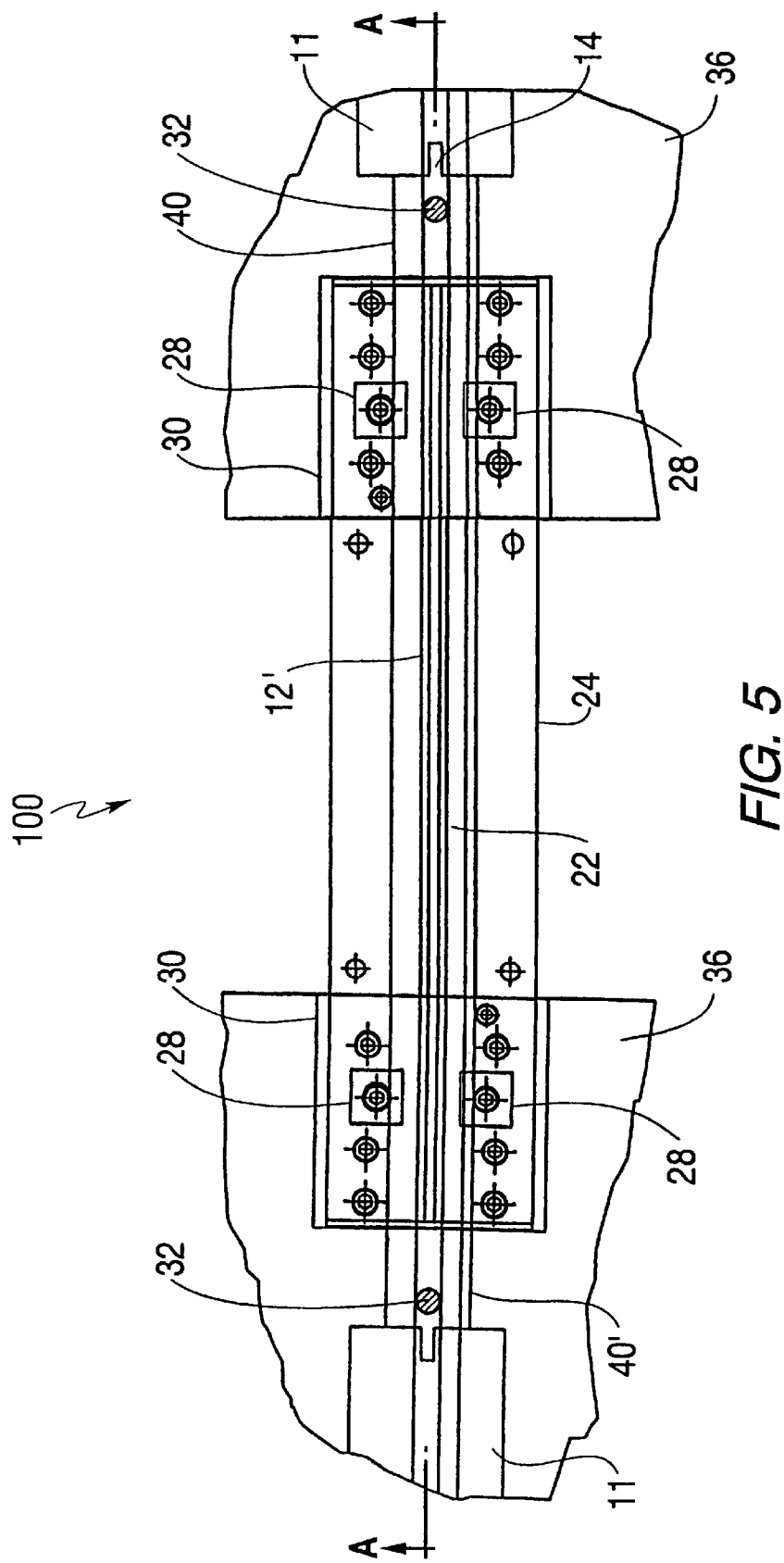
FIG. 5 shows a second embodiment of a removable rail assembly.

FIG. 5 shows a second embodiment of a removable rail assembly 100. The removable rail assembly 100 shares common features with the embodiment shown in FIG. 1. It will be appreciated that common reference numerals will be used to identify common features. Except for the jacking screw 32 received in the top surface 22, the rail assembly 100 is functionally and structurally identical to the embodiment described in FIGS. 1–4.

The removable rail assembly 100 includes a rail guide 12', a joint connector 14 and a support rail 24. The rail guide 12' includes a T-shaped member having a horizontally extending base 16 and an upwardly extending center portion 18. The center portion 19 includes a guide 20 that extends horizontally outward from the rail guide 12' at a position below the top surface 22.

Figure 6:
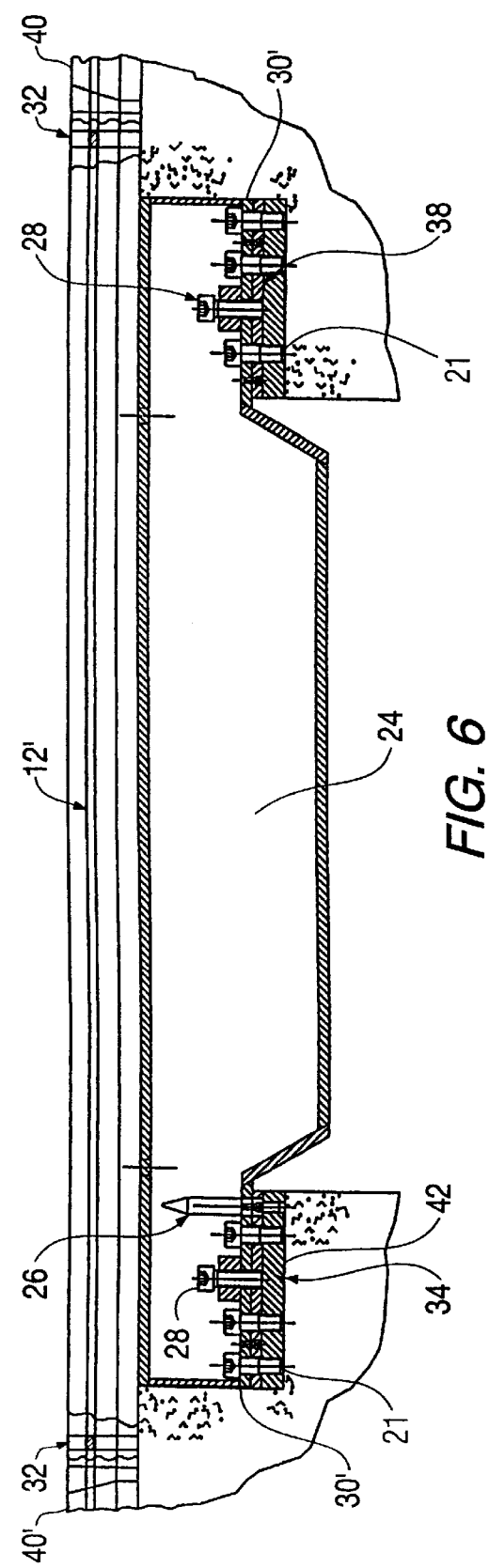
FIG. 6 shows a sectional view taken along the line A—A of FIG. 5.

The top surface 22 supports a jacking screw 32. As shown in FIGS. 5 and 6, one jacking screw 32 is received in each end 40, 40' of the rail guide 12'. The jacking screw 32 is received in a mating opening defined by the top surface 22 of the rail guide 12'. The jacking screw 32 extends through the depth of the rail guide 12 and is supported by the operating floor 36. As shown in FIGS. 5 and 6, one jacking 32 screw is supported by the top surface 22 in that portion of the rail guide 12' that extends beyond the support rail 24. Consequently, the jacking screw 32 is located on the top surface 22 between the joint connector 14 and the rail support 24.

The joint connector 14 couples each end of the rail guide 12' to a fixed rail 11. The joint connector 14 is a tongue and groove joint of the type previously described. Tightening the jacking screw 32 induces a force along the rail assembly 100, thus, causing loosening of the joint between the fixed rail 11 and the rail guide 12'. In the preferred embodiment, the jacking screw 32 induces a uniform lifting force along the rail assembly 100.

The support rail 24 supports the rail guide 12' using known techniques. The support rail 24, as previously discussed, is received within a recess defined by the operating floor 36. The lower flange 30' of the support rail 24 is received in the recess and is supported by an embedded plate 34, as illustrated by FIG. 6. The embedded plate 34, as previously described, supports a shim plate 38, and receives in mating openings an alignment pin 26 and at least one other jacking screw 28. The alignment pin 26 facilitates proper alignment of the rail guide 12' and the support rail 24. The jacking screw 28, when tightened, induces a force along the rail assembly 100. In the preferred embodiment, the lifting force induced along the rail guide 12' is of a uniform magnitude.

It will be appreciated that the jacking screws 28, 32 may be operated independently or cooperatively to facilitate loosening of the joint connector 14.

There are a variety of configurations that may be employed to fabricate the removable rail assemblies 10 and 100. Thus, the disclosed embodiments are given to illustrate the invention. However, the disclosed embodiments are not intended to limit the scope and spirit of the invention. Therefore, the invention should be limited only by the appended claims.

I claim:

1. A removable rail assembly for a spent fuel handling machine, comprising:
    a shim plate;
    a support rail coupled to the shim plate for adjusting the height level of the support rail;
    a removable rail guide carried by the support rail, said rail guide having a first end and a second end;
    a first rail joint connector supported by the rail guide for coupling the rail guide first end to a first adjacent fixed rail, the joint connector including a tongue and groove joint with a tapered parting line; and at least one jacking screw supported by the support rail and extending through the shim plate for lifting the support rail.

2. The removable rail assembly as defined in claim 1, wherein the tongue portion of the tongue and groove joint is supported by the removable rail guide.

3. The removable rail assembly as defined in claim 1, wherein the ends of the removable rail guide extend beyond the support rail and are supported by a rail trench.

4. The removable rail assembly as defined in claim 1, wherein the first end of the removable rail guide is coupled to a first rail end support member and the second end of the removable rail guide is coupled to a second rail end support member.

5. The removable rail assembly as defined in claim 4, wherein the first rail end support member is a threaded rod embedded in a structure that supports the support rail.

6. The removable rail assembly as defined in claim 1, wherein the support rail includes an I-beam cross-section.

7. The removable rail assembly as defined in claim 1, wherein the support rail receives an alignment pin.

8. The removable rail assembly as defined in claim 1, wherein the rail support is embedded in a floor surface.

9. A removable rail assembly for a spent fuel handling machine, comprising:

a. a support rail;

b. a removable rail guide carried by the support rail;

c. a rail joint connector supported by the support rail and having a tongue with a tapered parting line for coupling the removable rail guide to an adjacent fixed rail;

d. a shim plate coupled to the support rail; and e. means supported by the support rail and extending through the shim plate for at least loosening the joint connector for lifting the support rail to facilitate removal of said support rail.

10. The removable rail assembly of claim 1, further comprising a second rail joint connector supported by the rail guide for coupling the rail guide second end to a second adjacent fixed rail.

11. The removable rail assembly as defined in claim 10, wherein the second rail joint connector is a tongue and groove joint with a tapered parting line.

12. The removable rail assembly as defined in claim 4, wherein the second rail end support member is a threaded rod embedded in a structure that supports the support rail.

* * * * *